United States Patent [19]

Rodney

[11] Patent Number: 4,980,642
[45] Date of Patent: Dec. 25, 1990

[54] DETECTION OF INFLUX OF FLUIDS INVADING A BOREHOLE

[75] Inventor: Paul F. Rodney, Spring, Tex.

[73] Assignee: Baroid Technology, Inc., Houston, Tex.

[21] Appl. No.: 511,580

[22] Filed: Apr. 20, 1990

[51] Int. Cl.$^5$ .............................................. G01V 3/18
[52] U.S. Cl. ................................... 324/325; 324/341; 73/153
[58] Field of Search ....................... 324/324, 325, 341; 73/153; 367/25, 83

[56] References Cited

U.S. PATENT DOCUMENTS

| | | | |
|---|---|---|---|
| 3,776,032 | 12/1973 | Vogel | 73/155 |
| 3,982,176 | 9/1976 | Meador | 324/341 |
| 3,993,944 | 11/1976 | Meador et al. | 324/341 |
| 4,009,434 | 2/1977 | McKinlay et al. | 324/341 |
| 4,012,689 | 3/1977 | Cox et al. | 324/341 |
| 4,278,941 | 7/1981 | Freedman | 324/341 |
| 4,319,191 | 3/1982 | Meador et al. | 324/341 |
| 4,360,778 | 11/1982 | Freedman | 324/339 |
| 4,492,865 | 1/1985 | Murphy et al. | 250/265 |
| 4,536,713 | 8/1985 | Davis et al. | 324/324 |
| 4,571,693 | 2/1986 | Birchak et al. | 364/509 |
| 4,626,785 | 12/1986 | Hagiwara | 324/339 |
| 4,733,232 | 3/1988 | Grosso et al. | 367/83 |
| 4,733,233 | 3/1988 | Grosso | 367/83 |
| 4,891,916 | 6/1989 | Meador et al. | 324/341 |

OTHER PUBLICATIONS

L. D. Maus et al., Article Entitled, "Instrumentation Requirements for Kick Detection in Deep Water", Published in Aug. 1979 at pp. 1029-1034 of vol. 31, of *The Journal of Petroleum Technology*.

M. H. Westerheim, Paper Entitled, "Heave Compensated Kick and Loss Circulation Detector", presented at the 1979 Offshore Technology Conference, Published at p. 41 of the Proceedings Thereof.

D. I. Wilkie et al., Article entitled, "Dome's Kick Tolerance Formula for Safe Beaufort Sea Drilling", Published in Mar. 1981, at p. 33 of *Ocean Industry*.

*Primary Examiner*—Ian J. Lobo
*Attorney, Agent, or Firm*—Browning, Bushman, Anderson & Brookhart

[57] ABSTRACT

The present invention is directed to a system, apparatus and methods for determining influx of formation fluids into a well borehole during drilling. The methods of the present invention comprise determining the dielectric constant and/or conductivity of the fluid in the annulus about a drill pipe in a well borehole, comparing the determined dielectric constant and/or conductivity to a reference value and inferring that influx has occurred when the difference between the dielectric constant and/or conductivity and the reference value is greater than a predetermined limit. The dielectric constant and/or conductivity is determined by transmitting electromagnetic energy between about 10 KHz and about 10 GHz through the fluid in the annulus about the drill pipe from a transmitter located in the drill pipe section, receiving a portion of that energy which has travelled through the fluid but not through the surrounding formation in a receiver located in the drill pipe, and determining the dielectric constant and/or conductivity as a function of at least one of the phase and the amplitude of the received energy.

24 Claims, 8 Drawing Sheets

DETECTION OF INFLUX OF FLUIDS INVADING A BOREHOLE

BACKGROUND OF THE INVENTION

1. Field of the Invention

The present invention generally relates to an apparatus, system and method for determining influx of formation fluids into a well borehole. More particularly, the present invention relates to apparatus and methods for determining influx by measuring and comparing to a reference value the dielectric constant and/or conductivity of the fluid surrounding the drill string in the borehole. Accordingly, the present invention includes apparatus and methods for determining the dielectric constant and conductivity of the fluids in the borehole

2. Description of the Background

The detection of the influx of external fluids such as oil, water or gas from a geological formation into a well borehole during the drilling of the borehole through the formation is very important in oil and gas well drilling operations. Early influx detection is critical to safety and the avoidance of blowouts. Information obtained from the early detection of the influx of external fluids may be used to improve drilling efficiency by allowing the operator to adjust the weight and composition of the drilling fluid to very closely balance the formation pressure In addition, the influx of external fluids from the geological formation may be used to evaluate the oil or gas bearing qualities of the formation being drilled.

Early influx detection methods employed evaluation of surface measurable characteristics, e.g., mud pit volume, return flow rate and stand pipe pressure, to estimate influx. L. D. Maus, et al describe these early surface techniques in an article entitled, "Instrumentation Requirements for Kick Detection in Deep Water" published in August, 1979, at pages 1029–34 of V. 31 of *The Journal of Petroleum Technology*. M. H. Westerheim described an improved method of determining influx using improved measurements of annulus flow. This method minimized false alarms due to heaving of offshore rigs See "Heave Compensated Kick and Loss Circulation Detector" presented at the 1979 Offshore Technology Conference and published at page 41 of the proceedings thereof. A good summary of conventional methods for determining influx or kick was presented by D. I. Wilkie, et al in an article entitled "Dome's Kick Tolerance Formula for Safe Beufort Sea Drilling", published in March 1981, at page 33 of *Ocean Industry*. Wilkie described methods for determining kick including the observation of pressure measurements at the casing seat, the inference of pore pressure from seismic information, the observation of mud cuttings and the measurement of formation pressure.

The above references disclose surface measured or determined values to infer influx or kick Accordingly, these systems suffer from the significant time delays which might result between the time that influx or kick occurs at the drill bit and the drilling fluid is returned to the surface for examination. These delays not only may be disadvantageous but might also lead to undesirable blowouts. Delays are particularly troublesome in deep drilling operations where the drill bit may be 5,000 feet to 15,000 feet below the surface. In these conditions the time lag between influx and detection at the surface might exceed two hours. Accordingly, it would be highly advantageous to be able to determine influx near the drill bit and immediately to telemeter this desired information to the surface.

In recent years, a number of systems have been developed that have been designed to detect more rapidly the influx of external fluids into a well borehole during drilling of the well borehole These methods have employed sensors mounted on or near the drill bit so that the sensors measure the influx of external fluids soon after the drill bit enters a geological formation containing formation fluids under high pressure which migrate into the drilling fluid. Any conventional borehole telemetry system may then be used for transmitting the acquired data to the surface for immediate analysis. The preferred systems now appear to comprise the various mud pulse telemetry systems, including positive, negative and acoustic telemetry systems, which telemeter the information to the surface at the speed of sound.

Several apparatus and methods for determining influx near the drill bit and telemetering that information to the surface have been disclosed. U.S. Pat. No. 4,492,865 discloses an apparatus and method for determining influx in a borehole using gamma radiation to measure the density of the fluid in the borehole U.S. Pat. No. 3,776,032 discloses an apparatus and method for detecting influx employing acoustic waves to measure gas influx and resistivity to measure water influx.

Other methods of determining downhole characteristics of the geological formation or of the well bore fluids are well known to those skilled in the art. However, those characteristics have not been measured and used to determine influx. For example, U.S. Pat. No. 4,571,693 discloses an apparatus and method for determining density of the fluid using acoustic, preferably ultrasonic, waves. U.S. Pat. No. 4,536,713 discloses an apparatus and method for determining resistivity of a flowing drilling fluid using eddy currents generated in the fluid in a gap in a ferrite core encircled by a magnetic coil to which a constant current or voltage has been applied. However, none of these methods have been employed to determine influx of formation fluids into the drilling fluid in the annulus surrounding the drill string.

Other systems have been used to determine electrical characteristics of the surrounding geological formation. In fact, geological formations have been electrically logged for more than half a century. U.S. Pat. No. 4,360,778 discloses the high frequency induction logging of a geological formation to locate interfaces between different zones in the formation. U.S. Pat. No. 4,009,434 discloses dielectric well logging for determining water and residual oil saturation in the surrounding geological formation. A multitude of patents have been directed to the determination of the dielectric constant or the resistivity of the surrounding formation. For example, U.S. Pat. Nos. 4,626,785; 4,278,941; and 4,319,191 all disclose apparatus and methods for determining the dielectric constant of the formation surrounding the borehole. U.S. Pat. Nos. 4,012,689; 3,891,916; 3,982,176; and 3,993,944 all disclose apparatus and methods for determining not only the dielectric constant, but also resistivity of the formation surrounding the borehole. However, none of these techniques have been employed to determine the dielectric constant or conductivity of the fluid in the borehole or to determine influx therefrom.

The prior art systems described above fail to provide an ideal influx detection system. Those skilled in the art still desire a simple, efficient, accurate and timely influx detection system. Accordingly, there has been a long felt but unfulfilled need within the oil and gas drilling industry for a system, apparatus and method for efficiently, accurately and quickly determining influx at or near the drill bit and telemetering that information to the surface where it is immediately available for use by the drilling operator

SUMMARY OF THE INVENTION

The systems, apparatus and methods of the present invention provide a significant improvement over the prior art devices and methods for detecting the influx into a well borehole of fluids from the surrounding geological formation. The apparatus and methods of the present invention detect the influx of external fluids by indirectly, electromagnetically measuring the dielectric constant and/or the conductivity of the fluid in the well borehole surrounding the drill string. When an external fluid flows into the well being drilled, the presence of the external fluid causes the dielectric constant and conductivity of the drilling fluid to change. These changes are monitored to indicate the invasion of an external fluid into the well borehole.

The dielectric constant and the conductivity of the drilling fluid effect the phase shift and the absorption of an electromagnetic wave propagated in the drilling fluid. The apparatus and methods of the present invention utilize this fact to obtain information concerning changes in the dielectric constant and the conductivity of the drilling fluid from observed changes in the phase and amplitude of an electromagnetic wave propagated in the drilling fluid. The method of the present invention is capable of detecting phase shifts and amplitude changes over a wide range of electromagnetic frequencies. The detected phase shift and amplitude changes are indicative of the presence of an external fluid in the well borehole.

The methods of the present invention comprise determining the dielectric constant and/or conductivity of the fluid in the annulus about a drill pipe in a well borehole, comparing the determined dielectric constant and/or conductivity to a reference value and inferring that influx has occurred when the difference between the dielectric constant and the reference value is greater than a predetermined limit. The methods further comprise telemetering to the surface a signal indicative of the presence of influx and sounding an alarm at the surface to warn that influx has occurred. The methods of the present invention also permit the quantitative determination of the amount of influx which has occurred.

In the methods of the present invention, electromagnetic energy is transmitted through the fluid in the annulus about the drill pipe from a transmitter located in the drill pipe. A portion of that energy which has traveled through the fluid but not through the surrounding formation is received at a receiver located on the drill pipe and the dielectric constant and/or conductivity is determined as a characteristic of the received energy. In a preferred embodiment the characteristic is at least one of the phase and the amplitude of the received energy. In an alternative embodiment the dielectric constant and/or conductivity is determined as a function of both the phase and the amplitude of the received energy, more specifically, by employing the phase shift and attenuation of that energy.

The electromagnetic energy is preferably in a frequency range between about 10 KHz and about 10 GHz. For determining dielectric constant or using dielectric constant to determine influx the electromagnetic energy is more preferably in a frequency range between about 20 MHz and about 10 GHz, most preferably in a frequency range between about 1 GHz and 10 GHz. For determining conductivity or using conductivity to determine influx, the frequency of the electromagnetic energy is more preferably between about 10 KHz and about 20 MHz, most preferably between about 10 KHz and about 2 MHz.

The system of the present invention comprises a drill pipe adapted at its ends for incorporation in a drill string, means disposed in the drill pipe for determining the dielectric constant and/or the conductivity of the fluid in the annulus surrounding the drill pipe, means disposed in the drill pipe for comparing the determined dielectric constant and/or conductivity with a reference value for determining whether influx has occurred, means disposed in the drill string for telemetering signals from the drill pipe to the surface and an alarm disposed at the surface and activated in response to a signal indicative of influx into the annulus. The electromagnetic energy is transmitted and received using antennas disposed in one or more recessed grooves about the periphery of the exterior of the drill pipe. In a preferred embodiment, the receivers are spaced not more than about six inches from the transmitter. Analysis of the received signals and determination of the dielectric constant and/or conductivity and inference of the presence of influx is performed in logic circuitry or a computer disposed in the drill pipe.

The system, apparatus and methods of the present invention provide a new and improved means for determining influx into a well borehole of fluid from the surrounding geological formation employing the dielectric constant and/or conductivity of the fluid in the annulus between the drill pipe and the formation. Further, the methods of the present invention provide means for quantitatively determining both the dielectric constant and the conductivity of the fluid in the annulus surrounding the drill string by transmitting and receiving electromagnetic energy through the borehole fluid but not through the surrounding formation. These and other meritorious features and advantages of the present invention will be more fully appreciated from the following detailed description and claim.

BRIEF DESCRIPTION OF THE DRAWINGS

Other features and intended advantages of the present invention will be more readily apparent by the references to the following detailed description in connection with the accompanying drawings wherein.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DESCRIPTION OF THE PREFERRED EMBODIMENT

Figure 1:
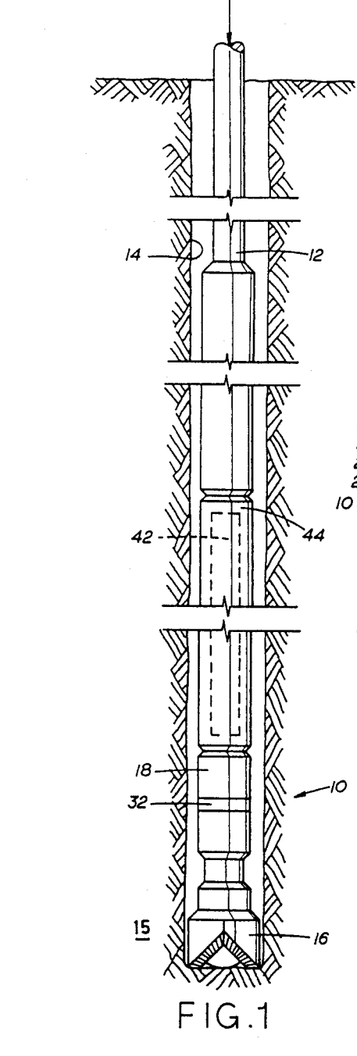
FIG. 1 is a schematic representation of the system of the present invention including both the drill pipe and surface equipment.

The present invention is directed to systems, apparatus and methods for detecting influx of external fluids into the annulus between a drill string and the surrounding geological formation by indirectly measuring the dielectric constant and/or the conductivity of the fluid in the well bore surrounding the drill string. In the methods of the present invention electromagnetic energy between about 10 KHz and about 10 GHz is transmitted through the fluid in the annulus, a portion of the energy which has travelled through the fluid but not through the surrounding formation is received, and the dielectric constant and/or conductivity is determined as a function of at least one of the phase and the amplitude of the received energy. The presence of influx is ascertained by comparison of the determined dielectric constant and/or conductivity with a reference. When influx is inferred, a signal is telemetered to the surface and an appropriate alarm sounded. FIG. 1 generally illustrates the components of a system in accord with the present invention Apparatus 10 comprises a drill string section having disposed therein the components necessary for determining the presence of influx by measuring the dielectric constant and/or conductivity downhole. Apparatus 10 is incorporated into a drill string 12 disposed in a well bore 14 being drilled through a geological formation 15. Apparatus 10 is preferably placed near the drill bit 16. As more readily seen in the cross-sectional illustration of FIG. 2, apparatus 10 comprises a tubular body 18 threaded at its ends for incorporation in a drill string 12 and characterized by a circumferential groove 20 disposed about its periphery. Tubular body 18 includes a central bore 22 along its axis to accommodate the flow of drilling fluids from the upper portions of the drill string 12 to and through the drill bit 16 below and into the annulus between the drill string 12 and the formation 15 for return to the surface. One end of tubular body 18 is threaded with a conventional male threaded connector 24 while the other end is threaded with a conventional female connector 26 for connecting the tubular body 18 within the drill string 12.

Figure 2:
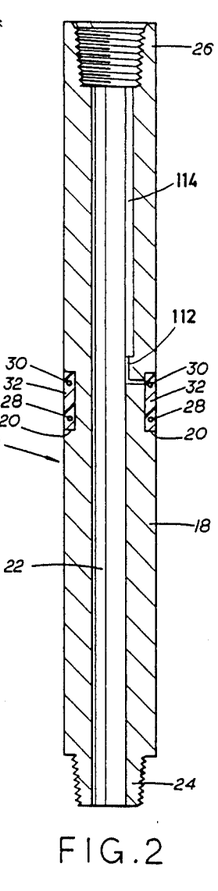
FIG. 2 is a cross-sectional illustration of a drill pipe section in accord with the apparatus of the present invention showing the relative locations of the transmitter and receiver within a circumferential groove about the tubular body of the apparatus.

An antenna 28 for transmitting an electromagnetic wave is mounted within groove 20 of tubular body 18. Transmitter 28 is preferably circular and disposed perpendicularly to the axis of symmetry of tubular body 18. The radius of transmitter 28 is chosen so that the whole of transmitter 28 is disposed within groove 20, i.e., no portion of transmitter 28 extends beyond the external surface of tubular body 18. Similarly mounted in groove 20 is a first receiver 30 for receiving a portion of the electromagnetic energy transmitted from transmitter 28. First receiver 30 is also preferably circular and disposed perpendicularly to the axis of symmetry of tubular body 18. The dimensions of first receiver 30 are preferably chosen to equal those of transmitter 28. While it is possible for the dimensions of transmitter 28 and first receiver 30 to be different, both transmitter 28 and first receiver 30 should fit within groove 20 as previously described.

Groove 20 is filled with a non-conducting material 32 after transmitter 28, first receiver 30 and their associated electrical connections have been mounted in their respective positions in groove 20. Non-conducting material 32 must be capable of withstanding the severe conditions of heat and abrasion encountered in drilling operations. Preferably insulator 32 is an appropriate elastomer, e.g., a synthetic or natural rubber. Insulator 32 serves to protect the transmitter 28 and the first receiver 30 from direct contact with the well drilling fluids and from debris in the well bore such as drill cuttings. Insulator 32 also serves to keep transmitter 28 and receiver 30 in their proper respective positions within groove 20.

Figure 3:
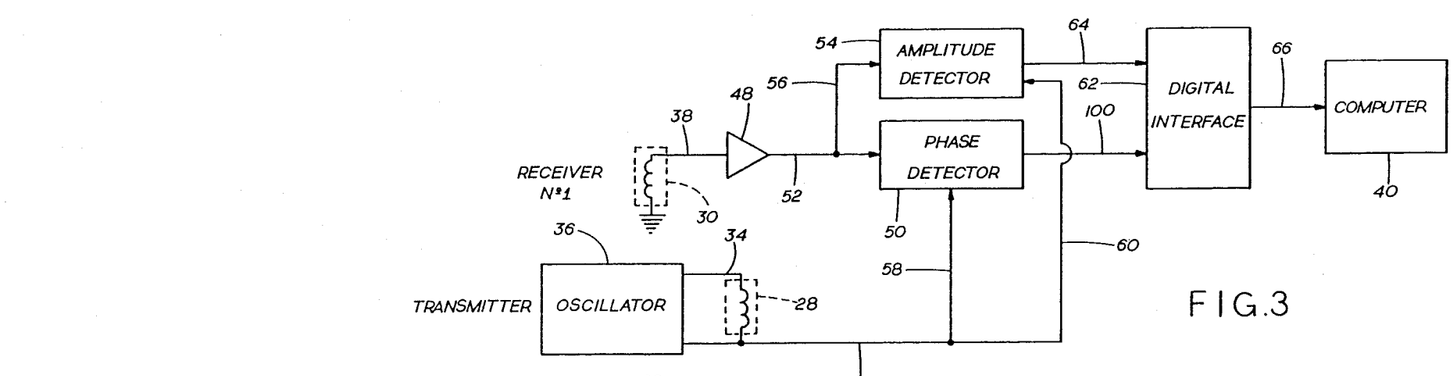
FIG. 3 is a circuit diagram showing illustrative electrical connections between a transmitter, receiver, detector circuitry and computer useful in the practice of the methods of the present invention.

The signals collected by first receiver 30 are processed in associated detector circuitry and transmitted for further processing to other logic circuitry or computer 40. The required detector circuitry together with additional logic circuitry and computer 40 are disposed within removable housing 114 on the interior of tubular body 18. Electrical connections between housing 114 and transmitter 28 and first receiver 30 disposed in groove 20 pass through conduit 112. Computer 40 is preferably in the form of a microprocessor capable of storing the data and transmitting the data to a telemetry system 42 located within a drill collar 44 also disposed in drill string 12. Electrical signals representing the determined information, i.e., the presence of influx and/or the dielectric constant and/or conductivity of the fluid in the annulus, are transmitted to conventional telemetry system 42 where the information is transmitted to surface detector and electronics 46. Any conventional telemetry system known to those skilled in the art may be used. Telemetry system 42 may conveniently be any of the various mud pulse telemetry systems which have become common in the well drilling industry. At the surface, the telemetry signal is detected and processed in surface detector and electronics 46. The presence of influx is announced by alarm 116. FIG. 3 illustrates an exemplary detector circuitry for use in connection with transmitter 28, first receiver 30 and computer 40. An electrically shielded signal line 34 connects transmitter 28 with an oscillator 36 that generates electromagnetic energy of the desired frequency.

Oscillator 36 is preferably capable of generating electromagnetic energy having a frequency in the range of ten KiloHertz (10 KHz) to ten GigaHertz (10 GHz). Another electrically shielded signal line 38 connects first receiver 30 with its associated detector circuitry. First receiver 30 detects the electromagnetic energy propagated through the borehole fluid from transmitter 28 and transmits an electrical signal representing the detected electromagnetic energy via signal line 38 to amplifier 48. The amplified signal is then transmitted to a phase detector 50 via signal line 52. The amplified signal is simultaneously transmitted to an amplitude detector via signal lines 52 and 56. An electrical signal representing the electromagnetic wave as originally transmitted is simultaneously transmitted via signal line 58 from oscillator 36 to phase detector 50. The same signal is also simultaneously transmitted to amplitude detector 54 via signal lines 58 and 60. This permits determination of the attenuation of the received signal. In an alternative embodiment, detector 54 merely measures amplitude of the received signal. In this alternative embodiment, attenuation is not determined and signal line 60 is unnecessary.

In the preferred embodiment amplitude detector 54 compares the electrical signal representing the amplitude of the electromagnetic energy as received from first receiver 30 and which is input on signal line 56 with the electrical energy representing the amplitude of the electromagnetic energy as transmitted from transmitter 28 and which is input on signal line 60 to obtain an attenuation value. An exemplary method of accomplishing this comparison is by converting each electrical signal from its analog form to a corresponding digital representation and then calculating the ratio of the two digital numbers representing the two amplitudes. Those skilled in the art are aware of other ways to electrically accomplish this comparison. The result represents the attenuation or change in amplitude of the electromagnetic energy as the wave passed from transmitter 28 to receiver 30 through the fluid in the well borehole between the drill string and the surrounding formation. An electrical signal representing the ratio of the two amplitudes is transmitted from amplitude detector 54 to digital interface 62 via signal line 64. The electrical signal is then transmitted via signal line 66 to logic circuit or computer 40 for temporary storage and transmission to the surface if desired. Alternatively, the simple amplitude is substituted for the attenuation.

Figure 4:
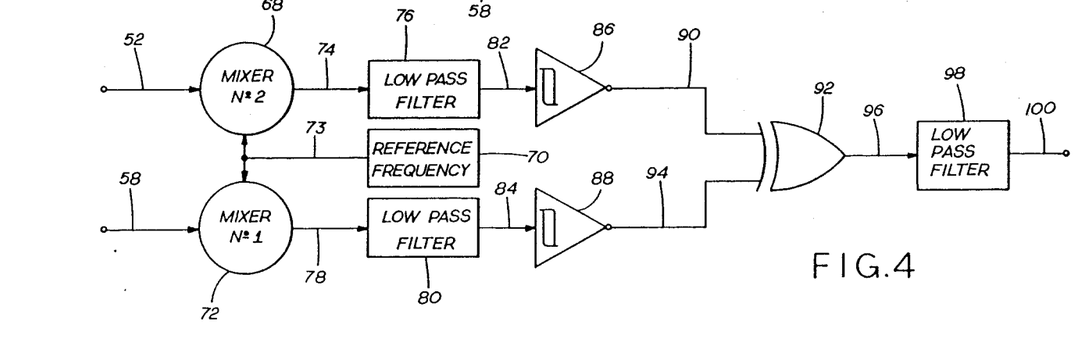
FIG. 4 is a circuit diagram showing illustrative detailed electrical connections between components of a phase detector useful in the practice of the methods of the present invention.

Similarly, a phase detector 50 compares the electrical signal representing the electromagnetic energy as received by first receiver 30 and which is input on signal line 52 with the electrical signal representing the electromagnetic energy as transmitted from transmitter 28 and which is input on signal line 58 to determine the change in the phase of the electromagnetic energy as the wave passed from transmitter 28 to receiver 30 through the fluid in the borehole. An exemplary circuit for accomplishing this well known form of comparison is depicted in FIG. 4. The electrical signal representing the electromagnetic energy as received by first receiver 30 is input on signal line 52 to an electronic signal mixer 68 where the electrical signal is mixed with a signal from a reference frequency source 70. In an alternative embodiment, reference frequency source 70 may be derived from the signal transmitted via signal line 58 from oscillator 36. In fact, such a derived signal is more stable than a separately generated signal. Simultaneously, the electrical signal representing the electromagnetic energy transmitted from transmitter 28 is input on signal line 58 to an electronic signal mixer 72 where the electrical signal is also mixed with the signal from reference frequency source 70. Signal line 73 transfers the reference frequency signal from reference frequency source 70 to mixer 68 and to mixer 72. The mixed signal from mixer 68 is transmitted via signal line 74 to low pass filter 76. Similarly, the mixed signal from mixer 72 is transmitted via signal line 78 to low pass filter 80. Low pass filters 76 and 80 filter out the higher frequency components of the signals and transmit only the low frequency components.

As further illustrated in FIG. 4, the low frequency components of the respective signals are transmitted via signal lines 82 and 84 to Schmitt trigger circuit 86 and to Schmitt trigger circuit 88, respectively. Responsive to the input wave form on signal line 82, Schmitt trigger 86 forms a first digital pulse which is transmitted over signal line 90 to a first input of an exclusive OR circuit 92. Similarly, responsive to the input wave form on signal line 84, Schmitt trigger 88 forms a second digital pulse which is transmitted over signal line 94 to a second input of exclusive OR circuit 92. The digital pulse that is output from exclusive OR circuit 92 onto signal line 96 represents the phase difference between the input wave form on signal line 82 which originated from first receiver 30 and the input wave form on signal line 84 which originated from transmitter 28. The digital pulse representing the phase difference between the two wave forms is transmitted via signal line 96 to low pass filter 98. The analog output of filter 98 is transmitted via signal line 100 to digital interface unit 62 where it is again converted to a digital signal as shown in FIGS. 3 and 4. The information in the digital signal, representing the phase difference between the two wave forms, is subsequently transmitted via signal line 66 to logic circuit or computer 40 for at least temporary storage and analysis. Alternatively, the signal may then be telemetered to the surface if desired.

The apparatus 10 used to practice the methods of the present invention is designed to confine the transmitted and received electromagnetic energy within the annulus formed between the tubular body 18 and the walls of the well bore 14. In the methods of the present invention, it is desirable that as little as possible of the transmitted electromagnetic energy enters the geological formation 15 surrounding the well bore 14. Accordingly, the frequency of the transmitted electromagnetic energy and the location and configuration of transmitter 28 and first receiver 30 are chosen to minimize energy transmission into the formation 15. In the broad embodiments of the methods of the present invention, the chosen frequency range is from about ten KiloHertz (10 KHz) to about ten GigaHertz 10 (10 GHz). In the preferred embodiments of the methods of the present invention, the frequencies are at the ends of this range. It is preferred to determine dielectric constant at frequencies from about twenty MegaHertz (20 MHz) to about ten GigaHertz (10 GHz) and conductivity at frequencies from about ten KiloHertz (10 KHz) to about twenty MegaHertz (20 MHz). Most preferably dielectric constant is determined using frequencies from about one GigaHertz (1 GHz) to about ten GigaHertz (10 GHz) and conductivity at frequencies from about ten KiloHertz (10 KHz) to about two MegaHertz (2 MHz).

Because the apparatus used to practice the methods of the present invention utilizes high frequency energy, the distance between transmitter 28 and first receiver 30 is preferably small. This close spacing between transmitter 28 and first receiver 30 also ensures that formation effects will be minimized. In the preferred embodiment of the present invention first receiver 30 is located no greater than about six inches (6") and more preferably no greater than about three inches (3") from transmitter 28.

Figure 5:
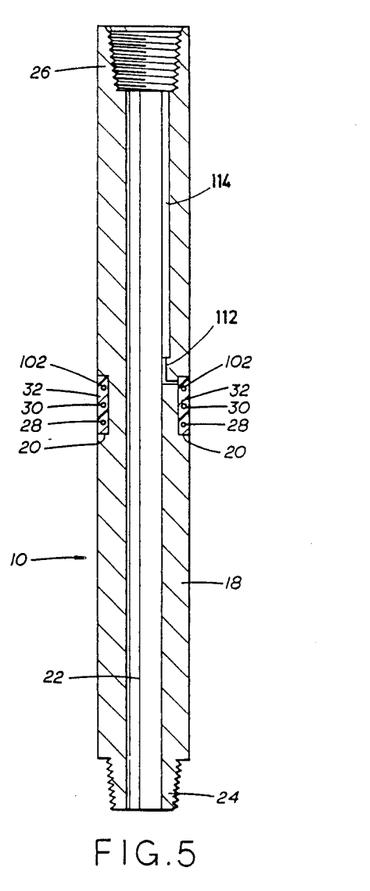
FIG. 5 is a cross-sectional illustration of a drill pipe section in accord with the present invention showing the relative locations of a transmitter together with both first and second receivers within a circumferential groove about the tubular body of the apparatus.
Figure 6:
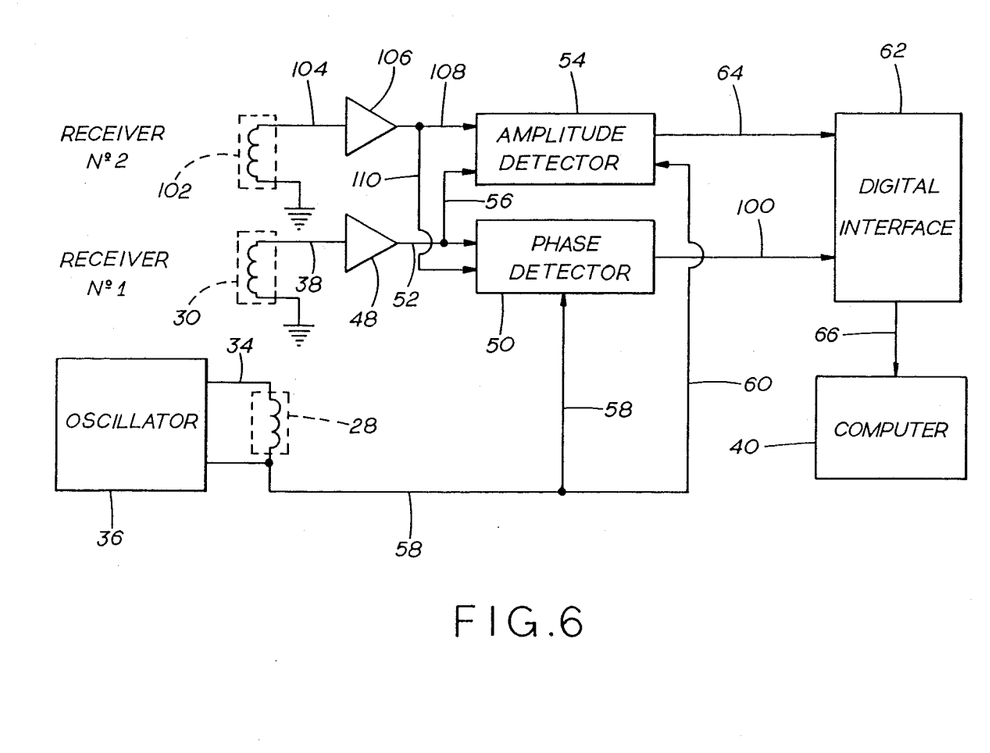
FIG. 6 is a circuit diagram showing illustrative electrical connections between a transmitter, first and second receivers, detector circuitry and a computer useful in the practice of the methods of the present invention.

An alternative embodiment of an apparatus in accord with the present invention but employing a plurality of receivers is illustrated in FIGS. 5 and 6. The basic structure of the apparatus 10 is the same except that a second receiver 102 has been added. As illustrated in FIG. 5, second receiver 102 is disposed within groove 20 of tubular body 18 substantially parallel to first receiver 30 and further away from transmitter 28 than first receiver 30. Second receiver 102 is mounted within groove 20 in the same manner as that described for mounting first receiver 30 and transmitter 28.

In this alternative embodiment, the associated detector circuitry is also slightly modified. As shown in FIG. 6, second receiver 102 is connected via signal line 104 to amplifier 106. Second receiver 102 detects the electromagnetic energy propagated from transmitter 28 and transmits an electrical signal representing the detected electromagnetic energy to amplifier 106. The amplified signal is then transmitted to amplitude detector 54 via signal line 108. The amplified signal is simultaneously transmitted to phase detector 50 via signal line 110. As before, first receiver 30 detects the electromagnetic energy propagated from transmitter 28 and transmits an electrical signal representing the detected electromagnetic energy to amplifier 48. The amplified signal is then transmitted to amplitude detector 54 via signal lines 52 and 56 and to phase detector 50 via signal line 52. Also, as before, an electrical signal representing the electromagnetic energy as originally transmitted is simultaneously transmitted via signal line 58 to phase detector 50 and is also simultaneously transmitted to amplitude detector 54 via signal lines 58 and 60.

In this alternative embodiment, amplitude detector 54 compares the electrical signal representing the amplitude of the electromagnetic energy as received by first receiver 30 and which is input on signal line 56 with the electrical signal representing the amplitude of the electromagnetic energy as received by second receiver 102 and which is input on signal line 108. The amplitude detector 54 converts each electrical signal from its analog form to a corresponding digital form and then calculates the ratio of the two digital numbers representing the change in amplitude of the electromagnetic energy as the energy passed from the location of the first receiver 30 to the location of the second receiver 102. Alternatively, the calculation of the attenuation may be done in logic circuit or computer 40. The electrical signal representing the attenuation or change in amplitude is transmitted to digital interface unit 62 via signal line 64, then to logic circuit or computer 40 via signal line 66 and, if desired, to telemetry system 42 as previously described.

In this alternative embodiment, phase detector 50 compares the electrical signal representing the electromagnetic energy as received by first receiver 30 and which is input on signal line 52 with the electrical signal representing the electromagnetic energy as received by second receiver 102 and which is input on signal line 110. Phase detector 50 then determines the change in the phase of the electromagnetic energy as the energy passed from the location of first receiver 30 to the location of second receiver 102. Phase detector 50 determines the phase change in the manner previously described with reference to the electronic circuitry shown in FIG. 4. As before, the electrical signal representing the change in phase is transmitted to digital interface 62 via signal line 100, to logic circuit or computer 40 via signal line 66 and, if desired, to telemetry system 42.

Figure 7A:
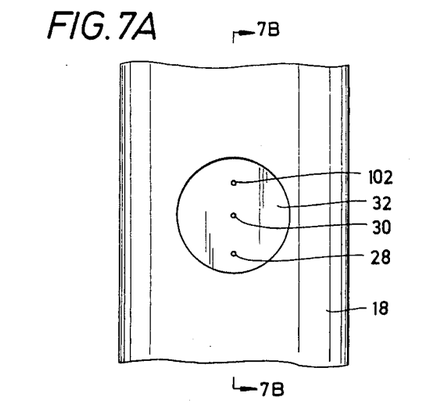
FIG. 7A is a side elevational illustration of an alternative transmitter and receiver configuration having a point transmitter and receivers disposed within a shallow circular bore in the tubular body of an apparatus in accord with the present invention.
Figure 7B:
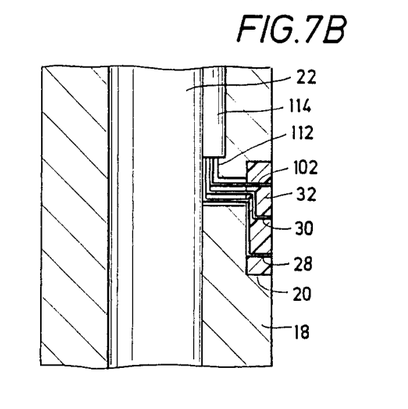
FIG. 7B is a cross-sectional illustration along line 7B—7B of FIG. 7A of the point antenna configuration of FIG. 7A.
Figure 8A:
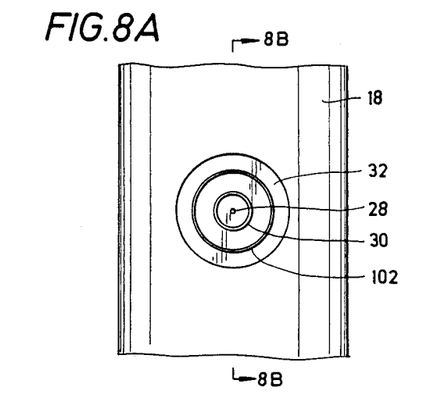
FIG. 8A is a side elevational illustration of another alternative antenna configuration having a point transmitter and concentric receivers all disposed in a shallow circular bore in the tubular body of an apparatus in accord with the present invention.
Figure 8B:
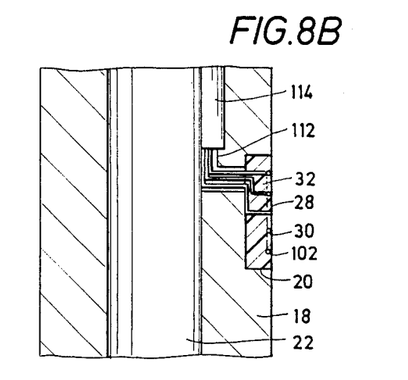
FIG. 8B is a cross-sectional illustration along line 8B—8B of FIG. 8A of the concentric antenna configuration of FIG. 8A.
Figure 9A:
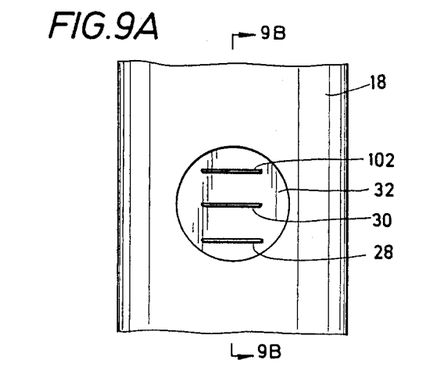
FIG. 9A is a side elevational illustration of still another alternative antenna configuration having a plurality of antenna comprising straight, parallel arcs or lines all disposed in a shallow circular bore in the tubular body of an apparatus in accord with the present invention.
Figure 9B:
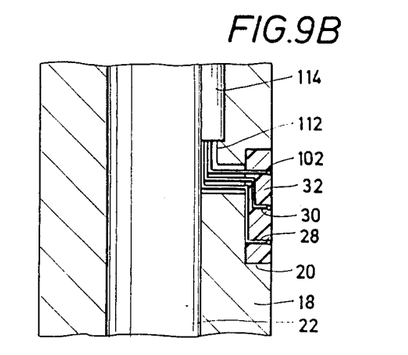
FIG. 9B is a cross-sectional illustration along line 9B—9B of FIG. 9A of the parallel arcs antenna configuration of FIG. 9A.

FIGS. 7-9 illustrate alternative electrode configurations. In FIGS. 7A and 7B, a shallow circular bore 20 has been drilled on the exterior surface of tubular body 18. A conduit 112 connects bore 20 to recessed groove 114 on central bore 22 of tubular body 18. Recessed groove 114 is designed to hold the associated electrical and logic circuitry and computer 40 (not shown). Transmitter 28, first receiver 30 and second receiver 102 are disposed within bore 20 and surrounded by non-conducting elastomer 32. Transmitter 28, first receiver 30 and second receiver 102 terminate near the surface of tubular body 18 to provide axially disposed point antennas.

FIGS. 8A and 8B illustrate another alternative antenna configuration. Tubular body 18 has been provided with shallow circular bore 20 as described above with relation to FIGS. 7A and 7B. Disposed near the center thereof is point transmitter 28 with first receiver 30 and second receiver 32 comprising circular antennas concentric therewith and mounted near the surface of tubular body 18.

FIGS. 9A and 9B illustrate another alternative embodiment. In this alternative, transmitter 28, first receiver 30 and second receiver 102 comprise substantially parallel, linear antenna elements, preferably disposed along an arc near the surface of tubular body 18 and substantially perpendicular to the axis thereof.

Figure 10:
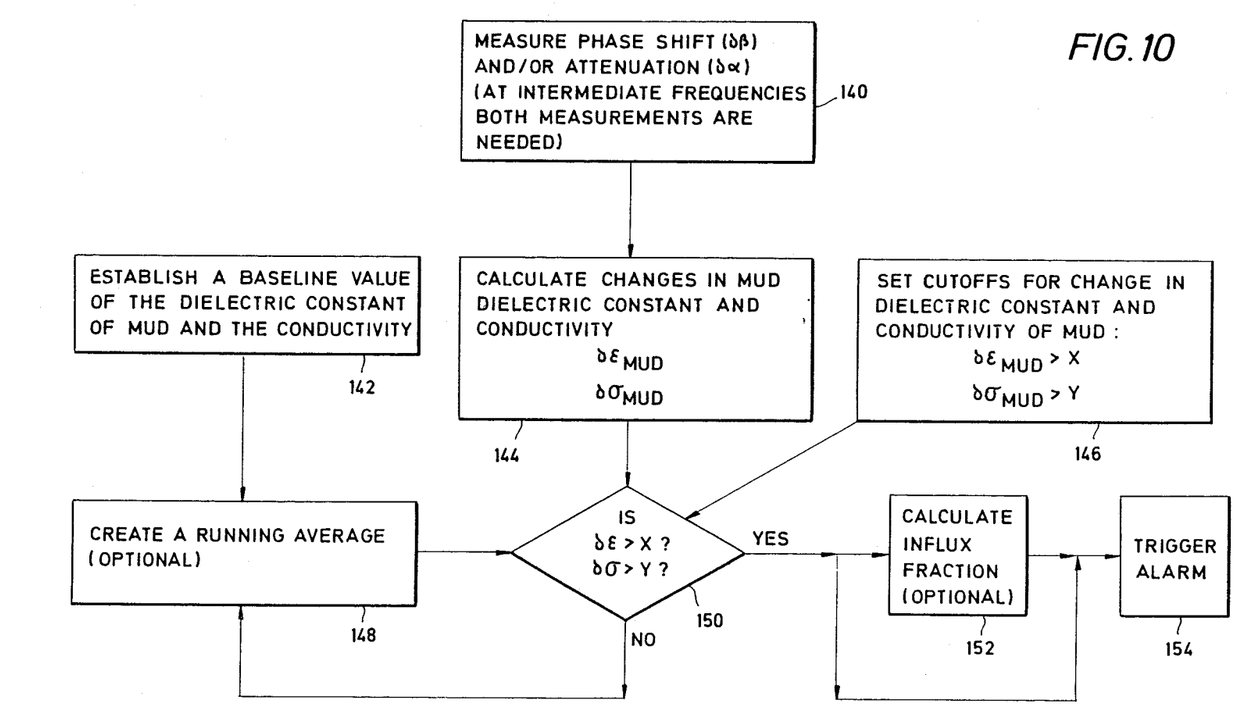
FIG. 10 is a flow chart diagram illustrating the steps of the methods of the present invention.

Both the dielectric constant and the conductivity effect the amplitude and phase of a propagating electromagnetic wave. The information concerning the attenuation or amplitude difference and the phase difference between the two wave forms may be used to detect changes in the dielectric constant and in the conductivity of the drilling fluid in the annulus by comparison to reference signals. Fig. 10 presents a flow chart illustrating the method of the present invention. The phase shift and/or attenuation is measured at 140. At high frequencies, i.e. between about 1 GHz and about 10 GHz, it is only necessary to determine the phase shift. At low frequencies, i.e., 10 KHz–2 MHz, it is only necessary to measure the attenuation. At intermediate frequencies both phase shift and attenuation should be determined.

The dielectric constant and/or conductivity of the fluid in the annulus and the change from the previous value or an assigned reference value, e.g., the value of the pure drilling fluid, is determined at 144. In one embodiment of the present invention it is the change in dielectric constant and/or conductivity, rather than the absolute value, which is examined. Accordingly, logic circuit or computer 40 is looking at 144 for a change greater than a predetermined value, e.g., X for dielectric constant and Y for conductivity. These predetermined values are set at 146. If the change in these values is less than the predetermined X or Y cutoffs, it is inferred that no influx has occurred. In an optional step, the reference dielectric constant and/or conductivity initially set at 142 may be updated by conventional averaging techniques at 148. If the change is greater than the predetermined cutoffs X or Y, it is inferred that influx has occurred and the alarm is triggered at 154. In an optional step, the influx fraction in quantitatively calculated at 152.

Figure 11:
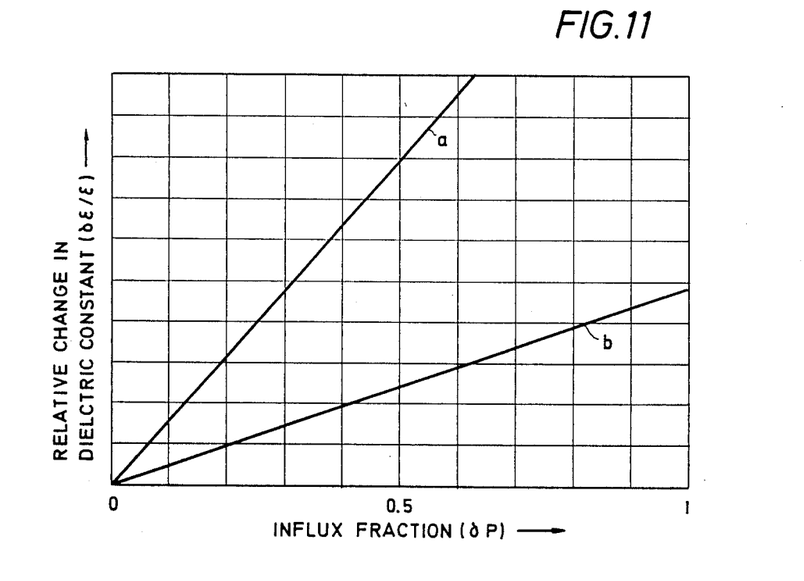
FIG. 11 is a graphical illustration of a look-up table showing the relationship between the influx fraction in the fluid in the borehole and the relative change in dielectric constant.
Figure 12:
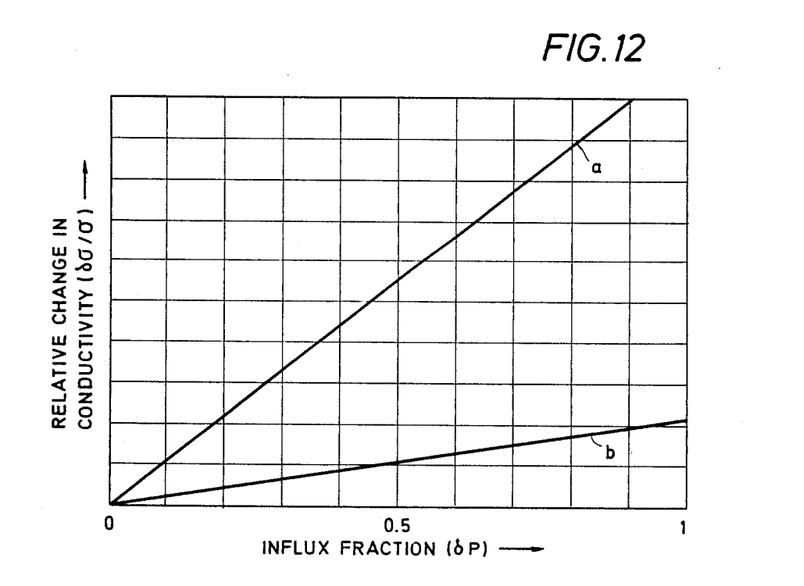
FIG. 12 is a graphical illustration of a look-up table showing the relationship between the influx fraction in the fluid in the borehole and the relative change in conductivity.

Figs. 11 and 12 illustrate the relation between influx fraction and relative change in dielectric constant and conductivity, respectively. In FIG. 11, the linear relationship between relative change in dielectric constant and influx under a first set of borehole and fluid characteristics A and a second, different set of characteristics B is illustrated. FIG. 12 illustrates the same linear relationship for relative change in conductivity for characteristics A and B. Quantitative information such as these illustrative lookup tables may be stored in computer 40 and the influx fraction determined by comparison thereto. Alternatively, those skilled in the art are aware of many conventional ways to interpret and calculate influx fraction from the linear relationships between influx fraction and relative change in dielectric constant and/or conductivity. Computer 40 is readily programmed to perform such routine calculations.

At low frequencies, i.e., less than about 100 KHz, the conductivity is the dominant factor. At high frequencies, i.e., greater than about 1 GHz, the dielectric constant is the dominant factor. Accordingly, at low frequencies, the detector apparatus of the invention will respond essentially only to changes in the conductivity of the drilling fluid. At high frequencies the detector apparatus of the present invention will respond essentially only to changes in the dielectric constant of the drilling fluid. Because water has a high dielectric constant, the apparatus and method of the present invention are highly sensitive to water influx into oil based muds. Finally, the apparatus and method of the present invention are very sensitive to any influx into water based muds. Although less sensitive, the apparatus and method of the present invention are still useful in determining hydrocarbon influx into oil based muds or water influx into water based muds.

Figure 13:
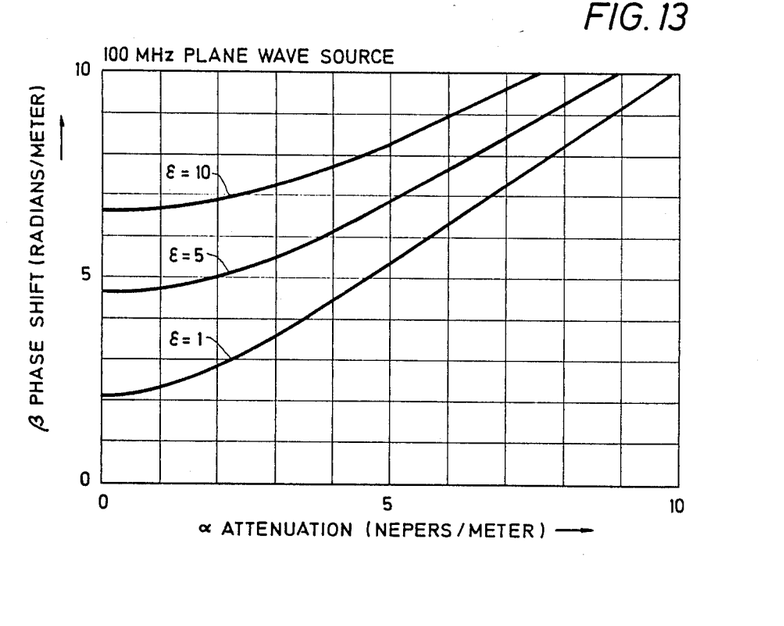
FIG. 13 is a graphical illustration of the relationship between the attenuation and the phase shift of the received signals at various dielectric constants using a 100 MHz plane wave source.
Figure 14:
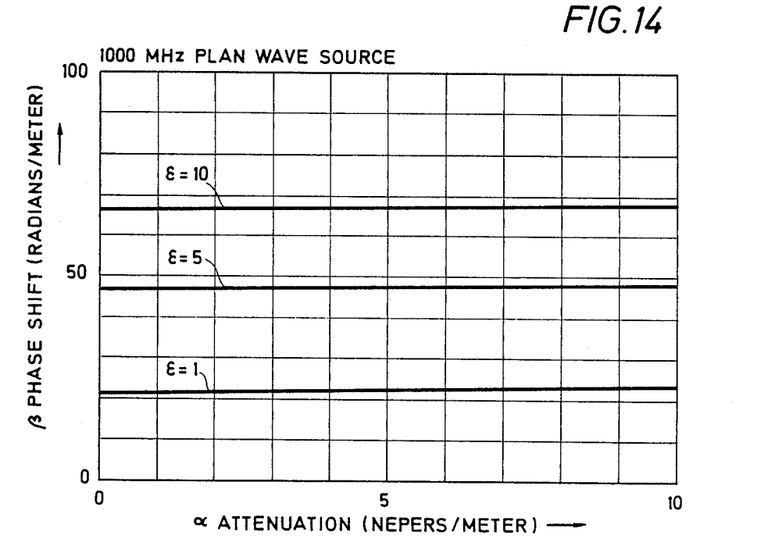
FIG. 14 is a graphical illustration of the relationship between the attenuation and the phase shift of the received signals at various dielectric constants using a 1000 MHz plane wave source.
Figure 15:
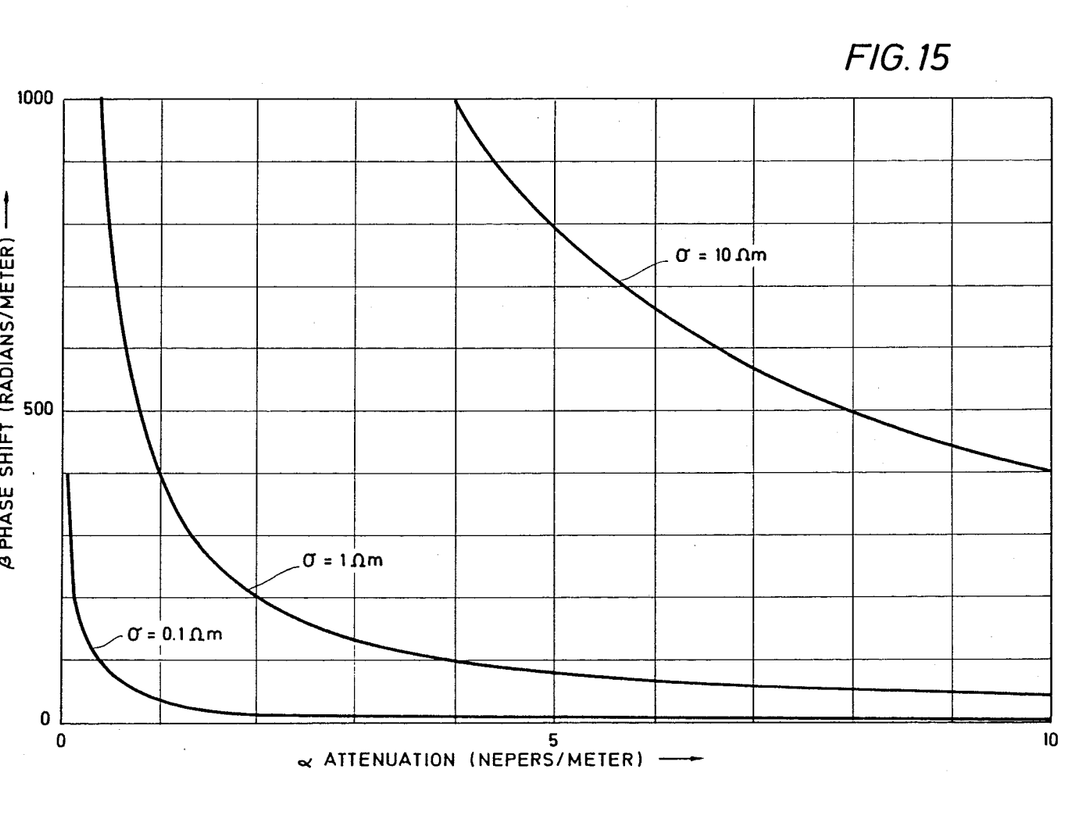
FIG. 15 is a graphical illustration of the relationship between the attenuation and the phase shift of the received signals at various conductivities using a 100 MHz plane wave source.

At intermediate frequencies, i.e., between about 20 MHz and about 250 MHz, the correlation between the changes in the dielectric constant and the conductivity with the changes in the attenuation or amplitude and the phase of the propagating electromagnetic wave is more complex. At these intermediate frequencies, the detector apparatus can detect influx of an external fluid into the drilling fluid best from the effect of the external fluid on the dielectric constant of the drilling fluid. Because both the phase shift and amplitude vary in these intermediate frequency ranges, it is preferred that both the attenuation or amplitude and the phase shift be determined and used to determine dielectric constant and presence of influx. FIG. 13 graphically illustrates this relationship. When using a 100 MHz plane wave source, the dielectric constant does not vary linearly with respect to the phase shift and attenuation. Accordingly, both the phase shift and attenuation should be determined in order to determine the dielectric constant in the intermediate frequency ranges. At higher frequencies, e.g., between about 1 GHz and about 10 GHz, the determination is simplified and only the phase shift need be determined. FIG. 14 graphically illustrates this relationship. When using a 1 GHz plane wave, the dielectric constant is essentially independent of the attenuation and may be determined simply from a determination of the phase shift. FIG. 15 graphically illustrates the similar relationship between the measured phase shift and attenuation and the conductivity using a 100 MHz plane wave.

The foregoing description of the invention has been directed in primary part to a particular preferred embodiment in accordance with the requirements of the patent statutes and for purposes of explanation and illustration. It will be apparent, however, to those skilled in the art that many modifications and changes in the specifically described system, apparatus and methods may be made without departing from the scope and spirit of the invention. For example, applicants have illustrated five exemplary antenna configurations and three exemplary detector circuits. Those skilled in the art are aware of numerous other configurations for these elements which could be useful in the present invention. Those skilled in the art will appreciate that many other modifications of the specific system and apparatus disclosed may produce the same results. Therefore, the invention is not restricted to the particular form of construction and method illustrated and described, but covers all modifications and variations which may fall within the true spirit and scope of the invention as set forth in the following claims.

What is claimed is:

1. A system for determining influx of formation fluids into the drilling mud in the annulus formed between a drill string terminating at its lower end in a drill bit and a borehole within which said drill string is disposed, comprising:

a drill pipe adapted at its ends for incorporation in said drill string;

means disposed in said drill pipe for determining the dielectric constant of the fluid in said annulus surrounding said drill pipe;

means disposed in said drill pipe for comparing said dielectric constant to a reference value for determining whether influx has occurred;

means disposed in said drill string for telemetering signals from said drill pipe to the surface; and an alarm disposed at the surface and activated in response to a signal indicative of influx into the annulus.

2. The system of claim 1 further comprising means for quantitatively determining the amount of influx into said annulus.

3. The system of claim wherein said means for determining said dielectric constant comprises:

means for transmitting electromagnetic energy at a frequency between about 20 MHz and about 10 GHz through the fluid in said annulus from a transmitter located on said drill pipe;

means for receiving a portion of said electromagnetic energy which has travelled through said fluid but not through the surrounding formation at a receiver located on said drill pipe; and means for determining said dielectric constant as a function of at least one of the phase and the amplitude of the received energy.

4. The system of claim 3 wherein said frequency is greater than about 1 GHz.

5. The system of claim 3 wherein said means for determining said dielectric constant and said means for comparing comprise computing means disposed in said drill pipe.

6. An apparatus for determining influx of formation fluids into the drilling mud in the annulus formed between a drill string terminating at its lower end in a drill bit and a borehole within which said drill string is disposed, comprising:

a drill pipe adapted at its ends for incorporation within said drill string;

means disposed in said drill pipe for determining the dielectric constant of the fluid in said annulus surrounding said drill pipe; and means disposed in said drill pipe for comparing said dielectric constant to a reference value for determining whether influx has occurred.

7. The apparatus of claim 6 wherein said means for determining said dielectric constant comprises:

means for transmitting electromagnetic energy at a frequency between about 20 MHz and about 10 GHz through the fluid of said annulus from a transmitter located on said drill pipe;

means for receiving a portion of said electromagnetic energy which has travelled through said fluid but not through the surrounding formation, said receiving means located on said drill pipe and spaced from said transmitting means; and means for determining said dielectric constant as a function of at least one of the phase and the amplitude of the received energy.

8. The apparatus of claim 7 wherein said transmitting means transmits electromagnetic energy at a frequency greater than about I GHz.

9. The apparatus of claim 7 wherein said means for receiving comprises a pair of spaced receivers on said drill pipe at said receiver location.

10. The apparatus of claim 7 wherein said transmitting and receiving means comprise antennas disposed on but insulated from the exterior surface of said drill pipe and wherein said antennas are spaced apart by not more than about 6 inches.

11. The apparatus of claim 10 wherein said antennas are disposed within a recess about the periphery of the exterior of said drill pipe and wherein said antennas are disposed along a plurality of circular paths orthogonal to the axis of said drill pipe.

12. The apparatus of claim 11 wherein said antennas are circular and extend completely around said drill pipe along said circular paths.

13. The apparatus of claim 10 wherein said antennas are disposed within a recess about the periphery of the exterior of said drill pipe and wherein said transmitting means is a point antenna and said receiving means are circular antennas disposed concentrically to said transmitting means.

14. A method for detecting influx of formation fluids into the drilling mud in the annulus formed between a drill string terminating at its lower end in a drill bit and a borehole within which said drill string is disposed, comprising:

determining the dielectric constant of the fluid in said annulus at a location near said drill bit;

comparing said dielectric constant to a reference value; and inferring that influx has occurred when the difference between said dielectric constant and said reference value is greater than a predetermined limit.

15. The method of claim 14 further comprising telemetering to the surface a signal indicative of said influx and sounding an alarm at the surface to warn that influx has occurred.

16. The method of claim 14 further comprising quantitatively determining the amount of influx that has occurred.

17. The method of claim 14 wherein said reference value is the dielectric constant of the drilling mud within the interior of said drill string.

18. The method of claim !4 wherein said reference value is a weighted average of a plurality of preceding dielectric constant determinations in said borehole and further comprising updating said weighted average with each newly determined dielectric constant.

19. The method of claim 14 wherein said dielectric constant is determined by:

transmitting electromagnetic energy through the fluid in said annulus from a transmitter located on said drill pipe;

receiving at a receiver located on said drill pipe a portion of said electromagnetic energy which has travelled through said fluid but not through the surrounding formation; and determining said dielectric constant as a function of at least one of the phase and the amplitude of the received energy.

20. The method of claim 19 wherein said dielectric constant is determined as a function of both the phase and the amplitude of the received energy.

21. The method of claim 19 wherein said receiving step comprises receiving said energy at a pair of spaced detectors on said drill pipe.

22. The method of claim 19 wherein said electromagnetic energy is transmitted at a frequency between about 20 MHz and about 10 GHz.

23. The method of claim 2 wherein said electromagnetic energy is transmitted at a frequency greater than about 1 GHz.

24. The method of claim 23 wherein said electromagnetic energy is received after travelling not more than about 6 inches in said fluid.

* * * * *

UNITED STATES PATENT AND TRADEMARK OFFICE
CERTIFICATE OF CORRECTION

PATENT NO. : 4,980,642

DATED : December 25, 1990

INVENTOR(S) : Paul F. Rodney

It is certified that error appears in the above-identified patent and that said Letters Patent is hereby corrected as shown below:

In Col. 13, Claim 8, line 57, change "I" to --1--;

In Col. 14, Claim 18, line 35, change "!4" to --14--; and

In Col. 14, Claim 23, line 61, change "2" to --22--.

Signed and Sealed this

Twenty-first Day of April, 1992

Attest:

HARRY F. MANBECK, JR.

*Attesting Officer*     *Commissioner of Patents and Trademarks*